United States Patent [19]

Nordström

[11] Patent Number: 4,589,061
[45] Date of Patent: May 13, 1986

[54] METHOD OF VARYING RESPONSE FINENESS IN A CONTROL SYSTEM

[75] Inventor: Lennart Nordström, Linköping, Sweden

[73] Assignee: Saab-Scania Aktiebolag, Linköping, Sweden

[21] Appl. No.: 601,644

[22] Filed: Apr. 18, 1984

[30] Foreign Application Priority Data

Apr. 18, 1983 [SE] Sweden ............................. 8302136

[51] Int. Cl.$^4$ ............................................. G05B 13/02
[52] U.S. Cl. .................................... 364/157; 364/154; 318/594; 244/195
[58] Field of Search ....................... 364/154, 157, 160; 318/592, 594, 561; 244/195

[56] References Cited

U.S. PATENT DOCUMENTS

| | | | |
|---|---|---|---|
| 3,644,720 | 2/1972 | Falk | 364/157 |
| 4,052,598 | 10/1977 | Turner et al. | 364/157 |
| 4,218,733 | 8/1980 | Maselli | 364/157 |
| 4,236,685 | 12/1980 | Kissel | 244/195 |

Primary Examiner—Jerry Smith
Assistant Examiner—John R. Lastova
Attorney, Agent, or Firm—James E. Nilles; James R. Custin

[57] ABSTRACT

In a system for controlling a servo actuated controlled device, an input signifying the position of displacement of an aircraft stick or similar manipulatable unit is processed to provide a variable gain to the controlled device. In a predetermined range of positions of the stick in which it is spaced to one side of neutral (or in such a range at each side of neutral) the system operates with low gain during displacement of the stick through a predetermined distance in either direction from a turning point to which the stick had been brought by displacement in the opposite direction. For all other displacements in that range the system operates with high gain. The method thus provides for fast, positive response to coarse stick movements but fine response to small trimming movements.

6 Claims, 5 Drawing Figures

METHOD OF VARYING RESPONSE FINENESS IN A CONTROL SYSTEM

This invention relates to control systems that have a variable gain or ratio between displacement of a manipulatable control unit and a controlled device that is actuated in response to the control unit; and the invention is more particularly concerned with a method of varying the gain in such a system so that it operates with a low gain for small displacements of the control unit in conditions and positions of its displacement wherein fine response of the controlled device is desirable but operates with high gain in conditions and positions of control unit displacement wherein a coarse or rapid response of the controlled device is desirable.

The subject matter of this application is related to that of the applicant's co-pending application Ser. No. 601,260, filed Apr. 17, 1984, entitled "Control System Having Variably Biased Manipulatable Unit."

The system for pitch control of a high performance aircraft can be taken as typical of the various types of control systems that involve the problems and requirements addressed by this invention.

For relatively large forward and rearward movements of the manually actuated aircraft stick or control unit, the elevators or other pitch control surface are preferably actuated through large changes of position, in order to produce quick and positive responses to such control unit displacements. Thus, for coarse stick movements, intended to produce large and less precise responses of the aircraft, the control system should appropriately have a relatively high gain.

However, a high-gain control system does not lend itself well to precise control, and particularly to fine trimming adjustments. With a high gain, the relatively large control surface actuation produced by a small displacement of the control unit is likely to result in an overcorrection, to which the pilot reacts with a correction in the opposite direction that may also turn out to be excessive. Such pilot induced oscillations further complicate the difficulty of achieving precise control with a high-gain system.

Around the neutral or null point of the pitch control system, where the trimming of aircraft attitude is of greatest importance, it is appropriate and desirable for the system to have a low gain. If a large and rapid change of pitch attitude is desired, the stick will normally be displaced rapidly away from its neutral position through a range of positions in which a high gain is desirable. However, even at relatively large deflections of the pitch-controlling actuated surface, precise trimming of that surface may be necessary, as for gun aiming in a diving or steeply climbing fighter aircraft.

Thus there are some flight conditions in which the system should have a relatively high gain through a range of relatively large actuated-surface deflections and other flight conditions in which the system should have a relatively low gain in that same range of deflections. Although it is clearly undesirable to assign either a high gain or a low gain to the whole range of control unit displacements, it is obviously impractical to require the pilot to make manual adjustments of the gain ratio. Heretofore the only alternative to this compound dilemma has been to provide an intermediate value of gain, applicable to at least a substantial portion of the range of control stick deflections, in hopes of avoiding the disadvantages of a high gain and of a low gain, but at some sacrifice of the respective advantages of high-gain and low-gain operation.

With the foregoing considerations in mind, it is a general object of this invention to provide a method of so varying the gain in a control system of the character described as to provide for a relatively high gain when the control unit is manipulated through a predetermined range of its positions and in a manner appropriate for coarse changes in position of the actuated device but to provide for a substantially lower gain when control unit displacements in that same range are made in such a manner as to imply the performance of a trimming operation for which low gain is appropriate.

More specifically, it is an object of this invention to provide a method of controlling response fineness in a control system comprising a manipulatable unit that is displaceable toward and from a null position and a controlled device that is actuated toward and from a neutral position in reponse to displacements of said unit, said method providing for automatic selection as between high gain and low gain when the control unit is in a range of its positions that begins at a predetermined distance from its null position and extends away from that position, to cause the system to operate with high gain when the control unit is manipulated through large displaments in said range but to operate with low gain when the control unit is manipulated through any small displacement in said range that directly follows a reversal of the direction of its displacement and thus characterizes a trimming operation.

It is also a specific object of this invention to provide a method of controlling response fineness that achieves the objectives set forth above and which, in addition, provides for a low gain for all displacements of the control unit within a range adjacent to its null position, and can further provide for a gain of a different value for all displacements of the control unit through another range adjacent to the limit of its movement away from its null position.

In the accompanying drawings, which illustrate what is now regarded as the preferred manner of practicing the method of this invention.

Figure 1:
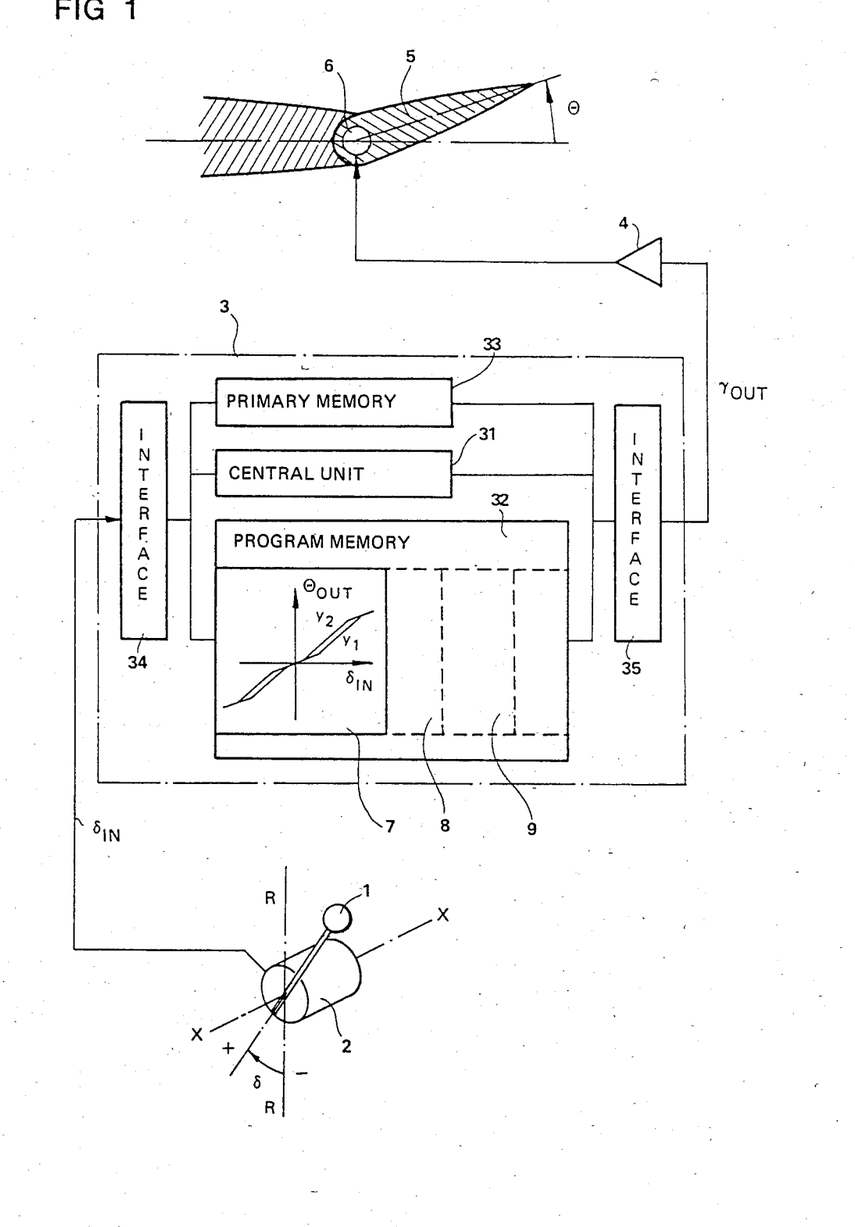
FIG. 1 schematically depicts a control system for the pitch control of an aircraft, typical of systems to which the method of this invention is applicable.

A control system to which the method of this invention is applicable comprises a manipulatable control unit 1, which is here illustrated as an aircraft control stick intended to be manually manipulated but which could be subjected to mechanical actuation, as by means of an automatic pilot. In this case the control unit is supported for swinging displacement about an axis X—X, but it could as well be displaceable in translation. The control unit 1 will in any case have a neutral or null position towards and from which it is displaceable; and it may be displaceable away from the null position in only one direction or, as in the case of an aircraft stick in both directions.

Connected to the control unit 1 is a signal transmitter 2 that generates an input which can be in analog form, as a steady signal of varying magnitude, or can be in digital form. Digital input signals are generated at regular intervals, typically at a frequency of 50 Hz. In either case the input has a magnitude $\delta_{IN}$ which at each instant unambiguously corresponds to the existing position of displacement of the control unit 1. For simplicity, the magnitude $\delta_{IN}$ can be considered to be the same thing as the input itself. In the case of digital input signals, each can be considered as identifying a position of the control unit, and the instantaneous magnitude of an analog input likewise signifies the concurrent position of that unit. It is here assumed that the input $\delta_{IN}$ is positive for control unit positions at one side of the null position and negative for those at the opposite side of the null position.

The input from the transmitter 2 is fed to a computing unit 3 by which an actuating output $\gamma_{OUT}$ is produced that may be in digital or analog form. The computing unit 3 is connected with an amplifier 4 from which the actuating output, as amplified, is in turn fed to an actuating instrumentality 6 in the form of a servo unit. In this case the servo unit 6 is mechanically linked to a control surface 5 which the control unit actuates in response to the amplified actuating output, to bring it to a position of displacement $\theta$ that is dependent upon the position of displacement $\delta_{IN}$ of the control unit 1 and upon other factors that are explained hereinafter. The servo unit 6 and the control surface 5 that it actuates thus comprise a controlled device.

For the method of this invention as practiced with digital signals the computing unit 3 is preferably a data processor that is programmed for the algorithms needed for various control situations. However, for a control system that has a low requirement for speed, the computing unit can comprise discrete components for working through the algorithms digitally or in analog form.

The data processor comprises, in general, a central unit 31, a program memory 32 and a primary memory 33. Interfaces 34 and 35, respectively connected to the input and to the output of the data processor, match the input $\delta_{IN}$ to the data processor and the output $\gamma_{OUT}$ to the amplifier 4 and the servo unit 6.

The data processor 3 is programmed to work through an algorithm, explained hereinafter, whereby, it determines, for each generated input $\delta_{IN}$, a magnitude $\theta_{OUT}$ that corresponds to an angle $\theta$ to which the controlled device is to be actuated in response to that input signal. That algorithm is stored in the program memory 32, and the box 7 in FIG. 1 designates a known type of instrumentality by which it is worked through. The output magnitude $\theta_{OUT}$ may be modified by further processing, as denoted by the boxes 8 and 9 in FIG. 1, to adjust it for flight conditions, load factor and the like, and thus convert it to the actuating output $\gamma_{OUT}$, which represents a demand value that unambiguously designates the angle $\theta$ to which the controlled device is to be actuated.

For purposes of explaining the present invention the modifications made in the calculated $\theta_{OUT}$ magnitude to obtain the $\gamma_{OUT}$ actuating output signal will be disregarded, and it will be assumed (as can be the case) that the actuating output has the $\theta_{OUT}$ magnitude. Accordingly, the magnitude $\theta_{OUT}$ is sometimes herein designated as the output.

Figure 2:
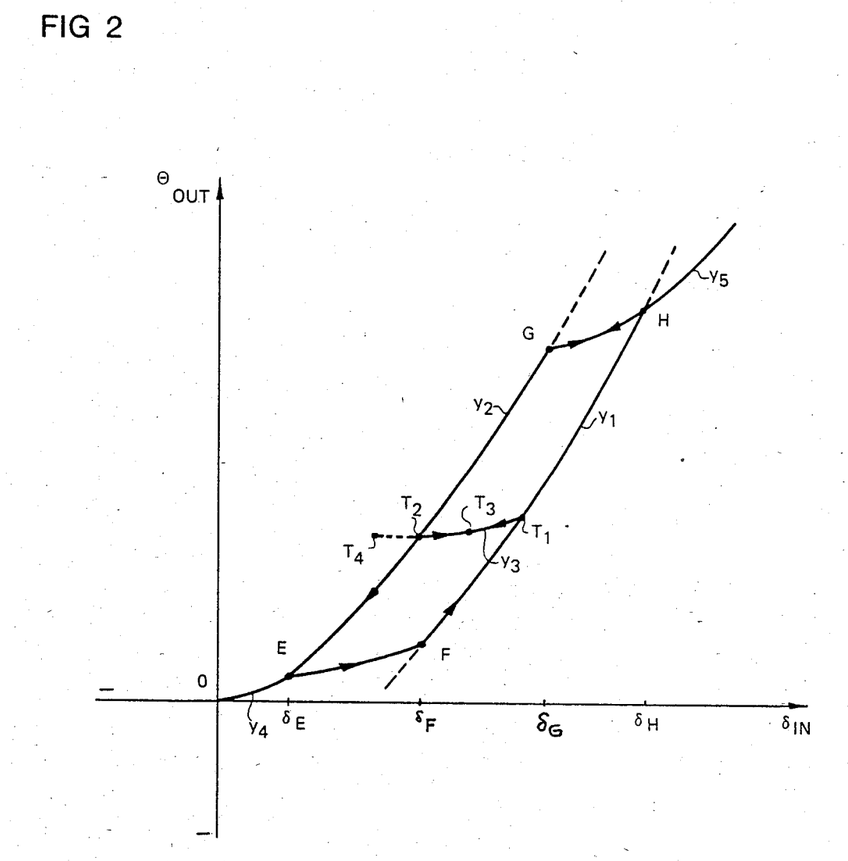
FIG. 2 is a diagram of the basic relationships between input and output signal magnitudes according to the method of this invention.

FIG. 2 represents, for positive displacements of the control stick, the relationships between input $\delta_{IN}$ and output $\theta_{OUT}$.

The direction of control unit movement away from the null position is herein designated the "increase" direction, since such movement effects an increased deflection of the controlled device, and the opposite direction of control unit displacement is designated the "decrease" direction.

In a first range of positions of displacement of the stick or control unit, extending from the null or neutral point O to a position designated by $\delta_E$, the system operates with a low gain, that is, a given increment of stick displacement brings about a relatively small increment of controlled device displacement, as denoted by the line segment OE, which represents a sequence of relationships between input signals $\delta_{IN}$ and output signals $\theta_{OUT}$. Within that O-$\delta_E$ range this low gain operation attends movements of the stick in both directions and thus facilitates accurate trimming in attitudes of substantially level flight.

In a second range of control unit positions, between the position $\delta_E$ and a position $\delta_F$, the system continues to operate with substantially the low gain just mentioned, as denoted by the line segment EF, provided the stick is moved continuously in the increase direction or is manipulated through successive displacements that carry it only in the increase direction. However, if such continued displacement in the increase direction carries the stick beyond the position $\delta_F$, then with continued movement in the increase direction, or with a succession of displacements that are only in the increase direction, the system operates with a different and substantially higher gain, as denoted by the line segment FH. Each of the line segments EF and FH again represents a sequence of relationships between input signals $\delta_{IN}$ and output signals $\theta_{OUT}$.

Depending upon characteristics designed into the particular control system, the point $\delta_H$ may be at the limit of displacement of the stick in the increase direction, or there may be a range of positions of the stick between its $\delta_H$ position and its limit position; and in the latter case the gain in that range, for both directions of control unit movement, may be different from the gain in the high gain range $\delta_F$-$\delta_H$, and may be the same as, or different from, the gain in the initial range O-$\delta_E$.

The conditions that arise upon reversals of direction of stick displacement in the range $\delta_E$-$\delta_H$ are discussed below. At this point, consideration is given to the manner in which the system operates when the stick is in a range of displacements between the position $\delta_E$ and a position $\delta_G$ which is intermediate the positions $\delta_F$ and $\delta_H$, and during movement of the stick steadily in the decrease direction or through a succession of displacements only in the decrease direction. Under those conditions the relation between the input signal $\delta_{IN}$ and the output signal $\theta_{OUT}$ will be as denoted by the line segment GE, which represents another sequence of relationships between input signals and output signals. It will be noted that the line segment GE lies to the left of the above discussed line segment FH, and its slope or gradient $\dot{y}_2$ is equal to—or at least generally similar to—the slope or gradient $y_1$ of the segment FH, so that the line segments GE and FH are more or less parallel to one another. What this relationship signifies is that for a given increment of stick displacement, the respective increments of controlled device displacement $\theta$ that are depicted by the respective lines FH and GE will be equal—or substantially so—and relatively high; but for a given position of displacement of the stick, the corresponding point on the segment GE designates a greater angle of displacement $\theta$ of the controlled device than the corresponding point on the segment FH.

If the control unit is in the range between its $\delta_E$ and $\delta_H$ positions and has first been displaced through a substantial distance in one direction and is then moved in the opposite direction, such reversal of direction of displacement can be regarded as a turning point. In FIG. 2, $T_1$ designates a turning point at which the direction of stick displacement has been reversed from increase to decrease, and $T_2$ designates a turning point at which the direction of stick displacement has been reversed from decrease to increase. After the stick has passed a turning point $T_1$ or $T_2$, and as it is displaced in the new direction through a limited distance from that turning point, the relationship of output signals $\theta_{OUT}$ to input signals $\delta_{IN}$ will be as depicted by the line $y_3$ in FIG. 2. It will be observed that the slope or gradient $\dot{y}_3$ of the line segment $y_3$ is on the order of the slope $\dot{y}_4$ of the line segments OE and EF, which is to say that it represents a relatively low gain, whereby a given increment of control stick displacement is attended by a relatively small displacement of the controlled device.

The line $y_3$ in FIG. 2 is one of a set of lines which can be visualized as drawn across the segments EH and GE to represent relationships of input to output signals after each of various turning points, each line of that set having a slope or gradient equal to—or substantially equal to—that of the illustrated line $y_3$. It will be noted that the line segment EF is in effect a member of this set, as is the line segment GH.

The several line segments EF, FH, HG and GE can be regarded as defining a belt-like modulation zone EFHGE wherein output signals $\theta_{OUT}$ are dependent not only upon their related input signals $\delta_{IN}$ but also upon the manner in which the stick had been manipulated immediately before each output signal was produced. Thus, depending upon the manner in which the pilot manipulates the stick, incremental stick displacements in the range of displacement positions between $\delta_E$ and $\delta_H$ can result in relatively large (high gain) incremental displacements of the controlled device or relatively small (low gain) displacements of that device. The output signal produced in response to every input signal in the range between $\delta_E$ and $\delta_H$ can be visualized as lying in the modulation zone EFHGE or on one of the segments that bound it.

At this point it may be observed that each of the several line segments OE, EF, FH, GE and $y_3$ may be either rectilinear or curvilinear, that is, it may have either a constant slope or gradient or one that increases in a non-uniform manner. Also, since the segments FH and GE need not be exactly parallel, the modulation zone EFHGE may be either wider or narrower at its top than at its bottom.

Figure 3:
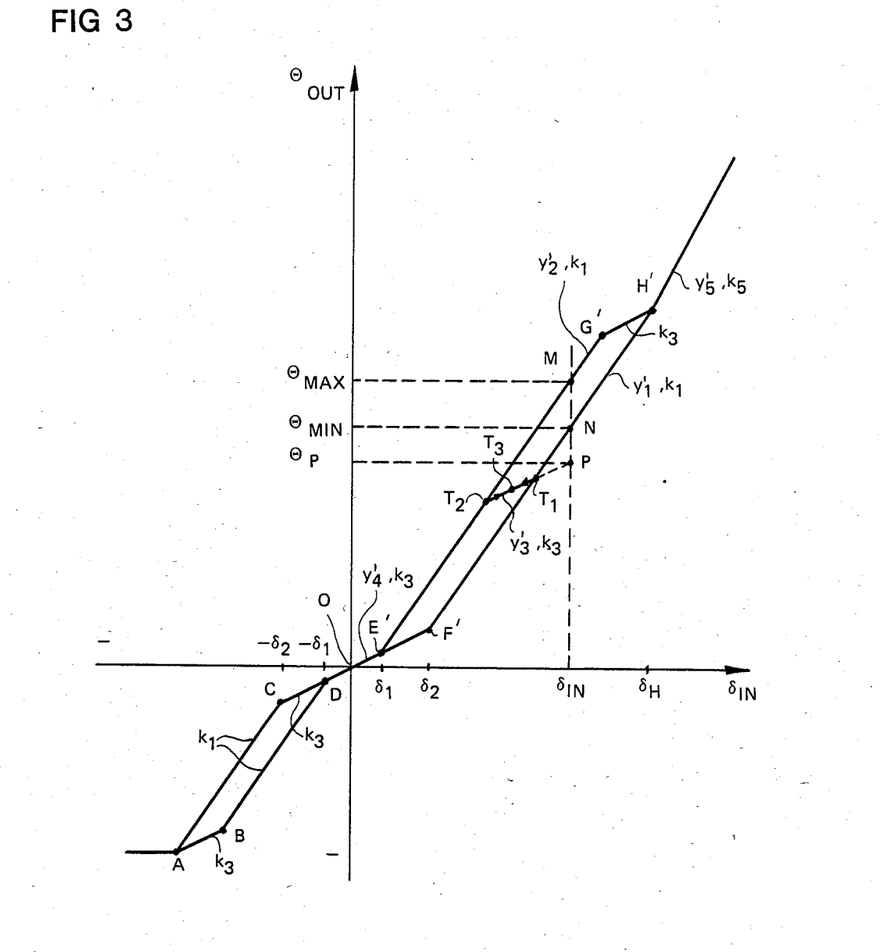
FIG. 3 is a diagram generally similar to FIG. 2 but more particularly showing the input and output signal relationships in a control system applicable to pitch control of an aircraft.

In the control system illustrated in FIG. 2 each of the sequences of input signal to output signal relationships is shown as having a generally curvilinear form, but in many applications, including aircraft pitch control channels, every sequence can be rectilinear, that is, can have a constant gradient. Accordingly FIG. 3 is a diagram for an aircraft pitch control system having rectilinear sequences of input signal to output signal relationships and having a modulation zone E'F'H'G'E' corresponding to the modulation zone for stick-back positions shown in FIG. 2 and a second generally similar zone ABDCA for forward stick positions. As is conventional, the stick-forward zone ABDCA is limited to a smaller range of stick positions than the stick-back zone E'F'H'G'E'. The diagram is in other respects the same for both sides of the neutral point O.

The manner in which the system functions to select the level of gain in accordance with maneuvering conditions will be more fully understood in the light of the following explanation of the invention in its method aspects.

The line segment OE' in FIG. 3 represents a first sequence of relationships between input signal magnitudes and output signal magnitudes that is defined and stored in the memory of the system. The sequence may be in the form of discrete values, or it can have the form of a function that defines a continuum of values. The output magnitudes $\theta_{OUT}$ in this first sequence are related to respective input signals $\delta_{IN}$ that designate positions of the control unit 1 between its null position and a position $\delta_E$ that is spaced from the null position by a predetermined distance in the increase direction. The output signal magnitudes $\theta_{OUT}$ in this first sequence have a gradient $k_3$ of increase in the increase direction relative to their related input signal magnitudes, which gradient, as explained above, corresponds to a relatively low gain.

The line segment G'E' represents a second sequence of relationships between input and output signal magnitudes, likewise stored in the system memory either as discrete values or as a function. The output signals of this second sequence are related to respective input signals $\delta_{IN}$ that designate positions of the control unit 1 between its $\delta_E$ position and a predetermined position $\delta_G$ that is spaced a substantial distance beyond $\delta_E$ in the increase direction. The output signal magnitudes in this second sequence have a second gradient $k_1$ of increase in the increase direction, said second gradient being substantially higher—that is, steeper—than the gradient $k_3$.

The line segment F'H' represents a third sequence of relationships between input and output signal magnitudes, likewise stored in the system memory either as discrete values or as a function. The output signals $\theta_{OUT}$ of this third sequence are related to respective input signals $\delta_{IN}$ that designate positions of the control unit 1 between a position $\delta_F$ that is intermediate its $\delta_E$ and $\delta_G$ positions and a position $\delta_H$ that is spaced beyond the $\delta_G$ position in the increase direction. The gradient of this third sequence is in this case equal to the gradient $k_1$ of the second sequence. Further, as mentioned above, for a given input signal $\delta_{IN}$, the related output signal magnitude $\theta_{OUT}$ in the third sequence F'H' signifies a smaller displacement of the controlled device 6, 5 from its neutral position than the related output signal magnitude in the second sequence G'E'.

The line $y_3$ represents one of a set of "trim" sequences of relationships between input and output signal magnitudes, similarly defined and stored in the system memory. The output signal magnitudes in each "trim" sequence are related to respective input signals $\delta_{IN}$ that designate positions of the control unit 1 between its $\delta_E$ position and its $\delta_H$ position. All of the "trim" sequences have like gradients or slopes that are in this case equal to the gradient $k_3$ of the first sequence.

There is a "trim" sequence in the set for every output signal magnitude in each of the second and third sequences. Furthermore, each "trim" sequence includes an output signal magnitude that is in the second sequence (G'E') and a different output signal magnitude that is in the third sequence (F'H'); and these two output signal magnitudes, which can be considered identifier magnitudes, can be visualized as the points at which the "trim" sequence line y₃ (or any "trim" sequence line parallel to it) intersects the respective line segments G'E' and F'H'.

As illustrated in FIG. 3, sequences of input signal to output signal relationships that are generally similar to those described above for the stick-back positions are also defined and stored for the stick-forward range.

As the method of this invention is practiced, information is temporarily stored that relates to the magnitude of each generated input signal and the magnitude of the output signal that was produced in response to it. Such information is employed in determining the magnitude of the output signal that is to be produced in response to the next generated input signal. After that next output signal is produced, the stored information can be discarded.

At this point it is to be observed that for input signals in the range of $\delta_E$ to $\delta_H$, produced output signals $\theta_{OUT}$ all fall within the modulation zone EFHGE. Therefore, stored input-output information for stick positions in that range can always identify a particular one of the set of "trim" sequences y₃. Thus, if the stored information designates an input-output pair $\delta_{IN}/\theta_{OUT}$ that can be visualized as falling on one of the line segments G'E' or F'H', then it denotes one of the identifier output signal magnitudes and accordingly identifies a particular one of the set of "trim" sequences. If on the other hand the stored $\delta_{IN}/\theta_{OUT}$ information designates a point which can be visualized as located between the line segments G'E' and F'H', then the stored information likewise designates a particular one of the "trim" sequences, since the $\delta_{IN}/\theta_{Out}$ relationships in each "trim" sequence (other than those for the identifier $\theta_{OUT}$ magnitudes) are all unique to that particular sequence.

The method proceeds on an initial assumption that the output signal to be produced in response to a newly generated input signal is to have the magnitude which is related to that input signal in the "trim" sequence identified by the stored information for the last preceding input signal. In effect, therefore, the method assumes that the stored information about the last preceding $\delta_{IN}/\theta_{OUT}$ signal pair designates a turning point, and the analysis continues on the assumption that the output signal magnitude for the newly generated input signal is to be determined from the particular "trim" sequence identified by the stored information. Thus, in terms of FIG. 3, three possible points that might be designated by stored information would be point T₁ on the segment F'H', point T₂ on segment G'E', or point T₃ which is between segments F'H' and G'E' and which is unique to the particular "trim" sequence y'₃ illustrated in the diagram. In each of those cases the stored information unambiguously designates the illustrated "trim" sequence, and a presumptive $\theta_{OUT}$ value is to be assigned from that "trim" sequence and will be the output value magnitude therein that is related to the newly generated input signal.

In terms of FIG. 3, it is to be borne in mind that each "trim" sequence extends substantially to the left and to the right of the modulation area E'F'H'G'E', and therefore the presumptive output signal magnitude may fall within that area or may fall outside of it, either to the left of it or to the right of it. If the presumptive output signal magnitude falls within the area E'F'H'G'E', that is, if it is neither larger than the magnitude designated by T₁ nor smaller than the magnitude designated by T₂, then the presumptive output signal magnitude is adopted as the actual output signal magnitude to be produced in response to the newly generated input signal.

The point P in FIG. 3 illustrates a case in which the presumptive output signal magnitude falls outside the modulation zone E'F'H'G'E'. Assuming that T₁ is the point designated by the stored information, then the fact that the point P is outside (to the right of) the modulation zone means that T₁ was not in fact a turning point, the stick has continued its movement in the increase direction, and the correct new output signal would be the one in the sequence F'H' that is related to the newly generated input signal. Similarly, a presumptive output signal magnitude to the left of the sequence G'E' would signify a continued movement of the stick in the decrease direction, and the actual output signal magnitude would be the one in the G'E' sequence that is related to the newly generated input signal.

The initial assumption that the output signal for a newly generated input signal will be contained in an identifiable "trim" sequence applies to stick displacement within the inital range $\delta_{O-\delta E}$, as well as to positions of displacement beyond that range, inasmuch as the first sequence, illustrated by segment OE', coincides with one of the "trim" sequences, and specifically comprises an extension of the "trim" sequence illustrated by segment E'F', which corresponds to the lower boundary of the modulation zone E'F'H'G'E'. Hence for input signals corresponding to stick positions within the range O-$\delta_E$ the actual output signal magnitude will be the same as the presumptive output signal magnitude.

Figure 4:
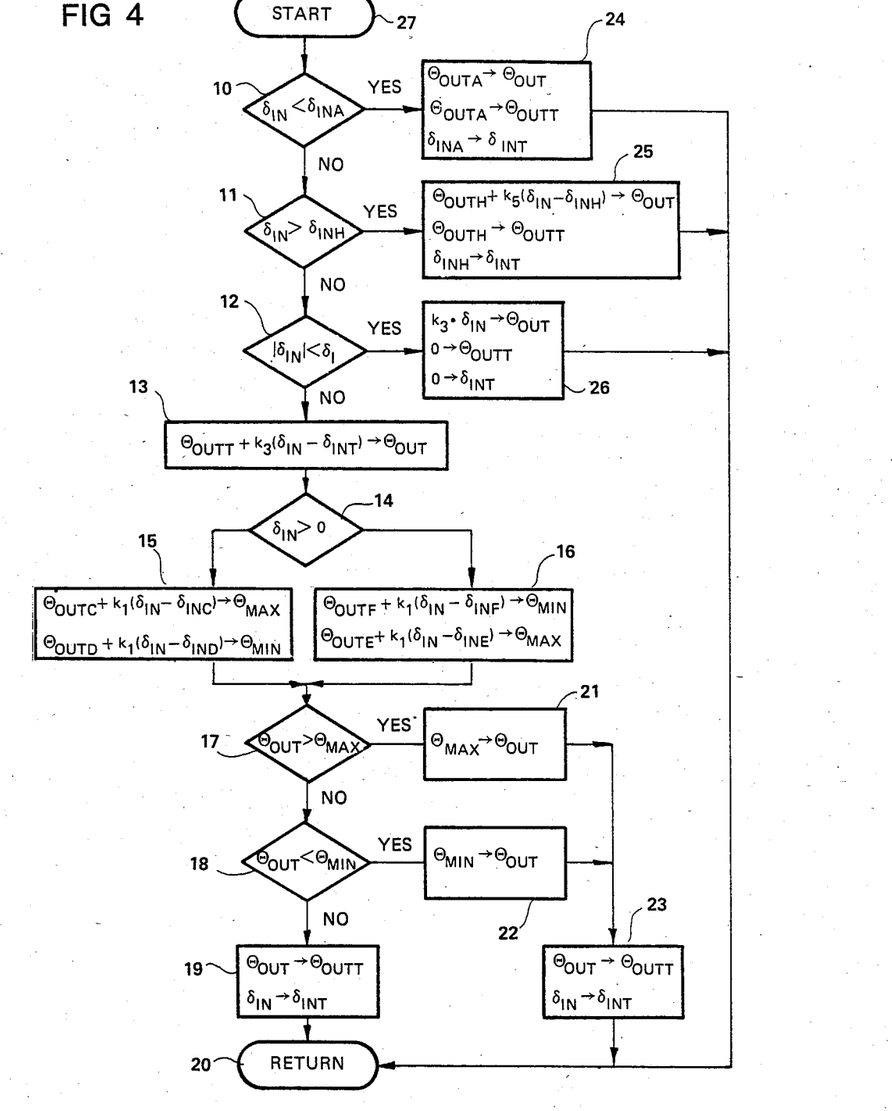
FIG. 4 is a flow diagram for an algorithm employed in the practice of the method of this invention.

The method of this invention will be more clearly understood from a consideration of the algorithm that is worked through for each newly generated input signal, illustrated in FIG. 4.

As illustrated by box 10, the newly generated input signal $\delta_{IN}$ is compared with the input signal magnitude $\delta_{INA}$ for the forward limit of the stick-forward modulation zone ABDCA, to determine whether the newly generated $\delta_{IN}$ signal has a magnitude less than that compared $\delta_{INA}$ magnitude. If it has—signifying that the stick is at or forward of the $\delta_A$ position—the output signal that is produced has the magnitude $\theta_{OUTA}$, which is assigned to the $\delta_{INA}$ input signal magnitude, as illustrated by the box 24. This output signal magnitude corresponds to a limit of down-elevator actuation and is in this case assigned to all stick positions that are near the front limit of stick displacement. As is also denoted by the box 24, information concerning this input signal and the output signal magnitude produced in response to it is preserved, as $\delta_{INT}$ and $\theta_{OUTT}$, respectively, for use in processing the next generated input signal.

If the magnitude of the newly generated input signal $\delta_{IN}$ is found not to be smaller than $\delta_{INA}$, it is next compared with an input signal magnitude $\delta_{INH}$ that corresponds to a stick position denoted by the point $\delta_H$ in FIG. 3, to determine whether the stick is in a range of its positions between the modulation zone E'F'H'G'E' and its most rearward position, in which range a relatively high gain is almost invariably desirable. If it is found to be in that rearmost range, then the output signal produced in response to the newly generated input signal will be assigned from a fifth sequence of input/output signal relationships, illustrated by line segment y'₅ in FIG. 3, and which has a gradient k₅. This determination of the output signal is illustrated by the box 25. Again, information concerning the input and output signal magnitudes is preserved for use in processing the next input signal, as denoted by $\delta_{INT}$ and $\theta_{OUTT}$ in box 25.

If the magnitude of the new input signal $\delta_{IN}$ is neither smaller than $\delta_{INA}$ (box 10) nor larger than $\delta_{INH}$ (box 11), then the absolute value of that input signal is compared with an input signal magnitude $\delta_1$, to determine whether the new input signal corresponds to a stick position in a level flight range that is near the null point O and between the ranges of stick positions in which the respective modulation zones are applicable. If the stick position is found to be within that level flight range, and is at the positive side of the null point, the output signal generated in response to the newly generated input signal will be determined according to the sequence illustrated in FIG. 3 by segment OE', as denoted by the box 26; and the stored information $\delta_{INT}$ for the input signal and $\theta_{OUTT}$ for the output signal will correspond to the input and output signal magnitudes for the null position of the stick, as also shown in box 26. If the stick is at the negative side of the null position, the output signal can be determined in the same way but will of course have a negative sign in conformity with the negative sign of the input signal, since segment OD' is the negative counterpart of segment OE'.

If the process illustrated by boxes 10, 11 and 12 results in a determination that the control stick is not in any of the ranges tested for in that procedure, then it must be in one of the ranges of positions for which either the modulation zone ABDCA or the modulation zone E'F'H'G'E' is applicable. Accordingly, as illustrated by box 13, there is assigned to the newly generated input signal, as a presumptive or tentative value of the output signal that will be produced for it, the output signal magnitude which is related to that input signal in the particular "trim" sequence identified by the stored information for the last preceding input signal.

Next, as illustrated by box 14, the magnitude of the newly generated input signal is compared with zero, to determine whether it represents a stick-forward position or a stickback position. If greater than zero, signifying a stick-back position (as is here assumed) the next stage of processing takes place as illustrated by the box 16; otherwise an analogous procedure is followed as illustrated by the box 15.

Let it now be assumed that the point P in FIG. 3 designates the relationship between a newly generated input signal $\delta_{IN}$ and the presumptive output signal magnitude $\theta_p$ that is assigned to that input signal. That presumptive value is assigned because the stored information for the preceding input signal corresponds to point $T_1$, which identifies the "trim" sequence that includes the input-output relationship designated by point P. For this particular input signal $\delta_{IN}$, the related output signal magnitude in the third sequence (segment F'H') would have the value denoted by point N, and the related output signal magnitude in the second sequence (G'E') would have the value denoted by point M. Therefore N designates a minimum magnitude that the actually produced output signal shall have, and M denotes a maximum value for it. The determination of these maximum and minimum values for stick-back positions is illustrated by box 16, and the corresponding determination for stick-forward positions is illustrated by box 15.

Next, as illustrated by box 17, the presumptive output magnitude is compared with the maximum value just determined; and if it is greater than that compared magnitude, then, as illustrated by box 21, the actual output signal produced in response to the newly generated input signal has a magnitude equal to that maximum magnitude. (This condition, which is not illustrated, would exist for one of a succession of stick positions in the decrease direction). If the condition tested for in box 17 does not exist, the presumptive output signal magnitude is compared with the just-determined minimum magnitude N, as illustrated by box 18, and in this case if the assumed magnitude is less than the compared minimum magnitude, the produced output signal has that minimum magnitude. This is the condition illustrated in FIG. 3, wherein the output signal that is produced for the input signal $\delta_{IN}$ is designated by point N.

Finally, if the assumed output signal magnitude is neither larger than the compared maximum magnitude nor smaller than the compared minimum magnitude, then an actual output signal is produced that has the same magnitude as the presumptive output signal. This last determination, which is illustrated in block 19, is made in a case such as is illustrated by point $T_3$ in FIG. 3, and, as explained above, occurs when the direction of stick displacement had been reversed, as at point $T_1$ or $T_2$, just prior to generation of the input signal being processed.

As designated by the return block 20, stored information for each input signal and the output signal produced in response to it is used for processing the next generated input signal.

A control system operating with a gain control method based on rectilinear sequences such as are illustrated in FIG. 3 has been successfully tested under actual flight conditions, both with and without gust accelerations. In the tested system the gradient for fine control was half of that for coarse control. The test demonstrated an advantageous influence upon control performance and control activity of the pilot, especially in gusty air, with less tendency towards overcontrol and pilot induced oscillations.

With a control stick having a maximum displacement of 15°–20°, it was found advantageous to set the breadth of the fine control zone at 2°.

Figure 5:
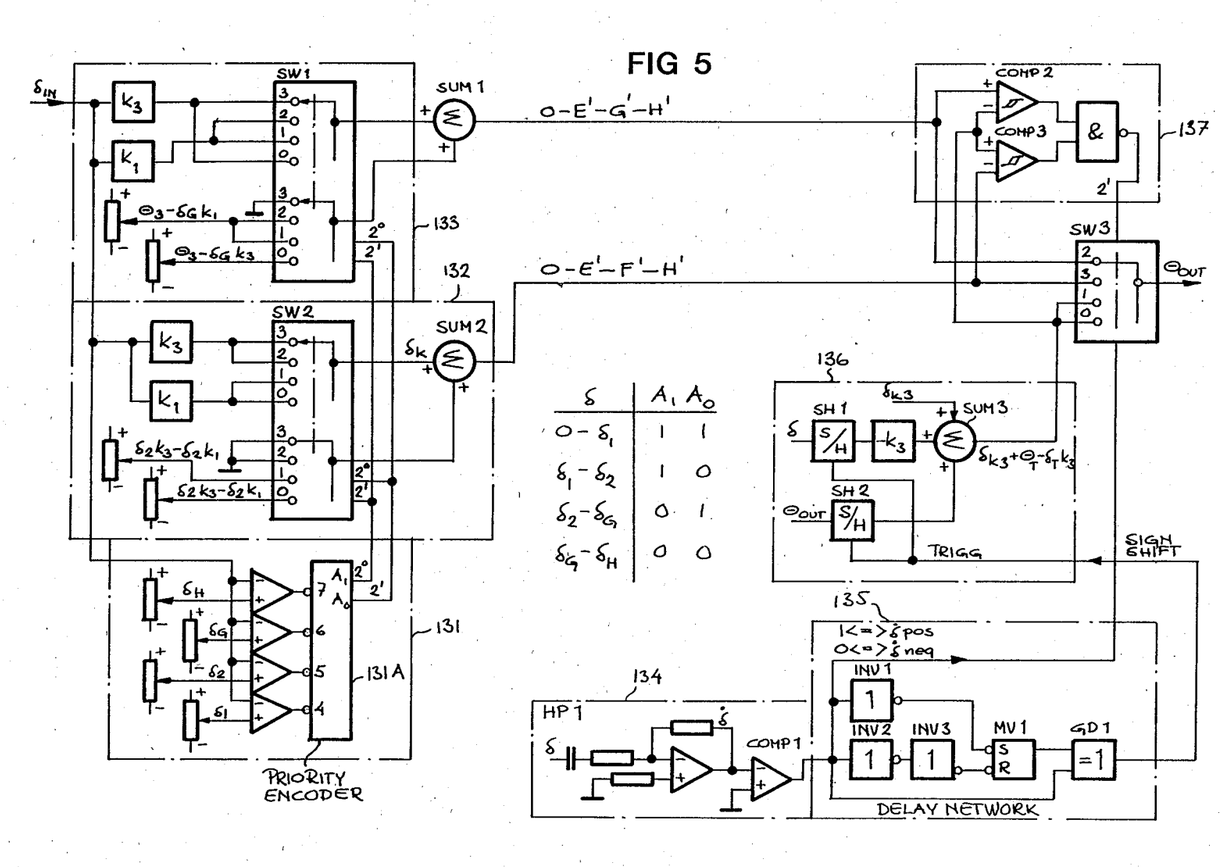
FIG. 5 diagrammatically depicts apparatus for practicing the invention with analog signals.

FIG. 5 schematically illustrates apparatus for practicing the method of this invention with an analog input $\delta_{IN}$, assumed to be a voltage having a value which at each instant signifies the existing position of the stick or control unit.

In apparatus signified by box 131, a determination is made of the particular part of its range (i.e., interval of its displacement) in which the stick or control unit 1 is positioned. This is done by comparing the magnitude of the existing $\delta_{IN}$ input with fixed voltages that are respectively equal to the inputs designated in FIG. 3 by $\delta_1$, $\delta_2$, $\delta_G$ and $\delta_H$. The results of these comparisons are fed to a priority encoder 131A, which produces a two-bit binary output, as shown in the table at the right of the block 131, that signifies the interval in which the stick is positioned.

The limit conditions depicted by the curve OE'F'H' in FIG. 3 are generated in the apparatus illustrated by box 132 in FIG. 5, irrespective of whether the stick is moving in the increase direction or in the decrease direction. The limit conditions depicted by the curve OE'G'H' are generated in a similar manner by the apparatus illustrated by box 133. Considering the box 132, the boxes inside it that are designated by $k_1$ and $k_3$ respectively designate multiplication of the input magnitude $\delta_{IN}$ by the gradient $k_1$ (corresponding to the slope of line segment F'H' in FIG. 3) and by the gradient $k_3$ (corresponding to the slope of the line segment E'F'). The applicable product $\delta_K$ is selected by the analog multiplexer switch SW2, which is controlled by the output of the priority encoder, and is fed to one input terminal of an adder or summing junction SUM2. The apparatus illustrated in box 132 also produces a fixed voltage corresponding to an offset value which compensates for the fact that the line segment F'H', if extended, would not pass through the null position. Under the control of the output from the priority encoder the switch SW2 also selects this fixed voltage when it is applicable, to be fed to the other input terminal of the summing junction SUM2, the output of which thus corresponds to the output magnitude on the line segment OE', E'F' or F'H', as the case may be, that is related to the then-existing input magnitude.

In like manner the apparatus illustrated by box 133 and its cooperating summing junction SUM1 produces an output that corresponds to the output magnitude on the line segment OE', E'G' or G'H', as the case may be, that is related to the then-existing input magnitude; and it does this irrespective of whether the stick is moving in the increase or in the decrease direction.

The determination of the direction in which the stick is being moved is made by apparatus illustrated by box 134, which comprises a high-pass filter HP1 to which the input $\delta_{IN}$ is fed and which produces the derivative $\dot{\delta}$ of that input. That derivative is fed to a comparator COMP1 which produces a positive output if the stick is moving in the increase direction and a negative output if it is moving in the decrease direction.

The output from the comparator COMP1 is fed to apparatus illustrated by box 135, which comprises inverters INV1, INV2 and INV3, a set-reset flip-flop MV1, and an exclusive-OR gate GD-1. The output of the flip-flop MV1 is fed to one input terminal of the exclusive-OR gate GD1, where it is compared to the univerted output of the comparator COMP1, which is connected with the other input terminal of that gate. If there is a change in the sign of the output from comparator COMP1, signifying a turning point or reversal of direction of stick movement, a short sign-shift pulse is issued by the exclusive-OR gate GD1. The inverters INV1, INV2 and INV3 are so connected that a negative output from the comparator COM1 sets the flip-flop MV1, so that it produces a "one" output, and a positive output from that comparator resets the flip-flop so that it produces a "zero" output. The circuit comprising the inverters and the flip-flop serves as a delay network, the delay in which determines the duration of the signshift pulse.

As pointed out hereinabove, a reversal of the direction of stick movement, in particular, calls for the making of comparisons with stored information about input magnitude and output magnitude. Accordingly, the apparatus illustrated by box 136 comprises a pair of sample-and-hold circuits, one designated SH1 for the $\delta_{IN}$ magnitude, the other designated SH2 for the $\theta_{OUT}$ magnitude, which is fed back from the output of the signal processing apparatus. Both of these sample-and-hold circuits are rendered operative by a sign-shift pulse from the exclusive—OR gate GD1.

From what has been said above it will be understood that the information stored in the sample-and-hold circuits SH1 and SH2 identifies a point that is either in the modulation zone E'F'H'G'E' or on the short line segment OE'; and in either case it thus also defines a "trim" sequence line which passes through that point and has the slope $k_3$. For the newly-existing magnitude $\delta_{IN}$ of the input, the related magnitude $\theta_{OUT}$ of the output on that defined line is given in terms of the stored input magnitude $\delta_{INT}$ and stored output magnitude $\theta_{OUTT}$ by:
$\delta_{IN} k_3 + (\theta_{OUTT} - \delta_{INT} k_3)$.

An output corresponding to the existing input magnitude $\delta_{IN}$ multiplied by the slope or gradient characteristic $k_3$ is available from the apparatus designated by either of the boxes 132 or 133 and is applied to one input terminal of the summing junction SUM3. An input corresponding to the stored output magnitude $\theta_{OUTT}$, from the sample-and-hold circuit SH2, is applied to another input terminal of the summing junction SUM3. From the sample-and-hold circuit SH1 an output corresponding to the stored input magnitude $\delta_{INT}$ is multiplied by the negative value of the slope characteristic $k_3$, and the product of this multiplication is applied to the third terminal of the summing junction SUM3. The output from that summing junction thus corresponds to a presumptive value of the output magnitude $\theta_{OUT}$.

At this point it will be seen that three possible output magnitudes are available for a given input magnitude $\delta_{IN}$ that follows a turning point, one at the output terminal of each of the summing junctions SUM1, SUM2 and SUM3. The selection from among these possibilities is made by the apparatus denoted by box 137, which comprises two comparators COMP2 and COMP3 that have their respective output terminals connected with respective input terminals of an AND-gate GD2. The summing junctions SUM1, SUM2 and SUM3 also have their respective output terminals connected to respective input terminals 2, 3 and 1 of a function switch SW3 that is controlled by the AND-gate GD2. The comparators COMP2 and COMP3 are of the Schmitt trigger type, to prevent unnecessary function changes in the function switch SW3.

The output of the summing junction SUM1 (which corresponds to the output magnitude on the "decrease" curve H'G'E'O that is related to the existing input $\delta_{IN}$) is fed to one input terminal of the comparator COMP2, and the output of the summing junction SUM2 (corresponding to the output magnitude on the "increase" curve OE'F'H' that is related to the existing input $\delta_{IN}$) is fed to one input terminal of the comparator COMP3. The other input terminal of each of those comparators COMP2, COMP3 is connected with the output terminal of the summing junction SUM3.

If the input from summing junction SUM3 to comparator COMP2 is larger than the input to that comparator from summing junction SUM1, comparator COMP2 produces a "one" output; otherwise it produces a "zero" output. If the input from summing junction SUM3 to comparator COMP3 is smaller than the input to that comparator from summing junction SUM2, comparator COMP3 produces a "one" output; otherwise it produces a "zero" output. With "zero" inputs to both of its input terminals, AND-gate GD2 produces a "zero" output and sets the function switch to either of its input terminals 1 or 0, both of which are connected to the output of summing junction SUM3, so that the produced output magnitude $\theta$OUT is the "trim" output generated at summing junction SUM3.

If the output of the AND—gate GD2 is "one", the output from function switch SW3 will be taken either from its terminal 2 or its terminal 3, depending upon whether the output of comparator COMP1 is negative or positive. The output of that comparator is also fed to the function switch SW3 for control of it, so that with stick movement in the decrease direction the output $\theta_{OUT}$ follows the curve OE'G'H' and with stick movement in the increase direction the output $\theta$OUT follows the curve OE'F'H'.

From the foregoing explanation it will be seen that when the method of this invention is applied to a control system with a manipulatable control unit and a controlled device that is actuated in response to displacements of the control unit, the system operates with a large gain when the control unit is moved through a substantially large continuous displacement in either direction or through a succession of smaller displacements that are all in the same direction, but it operates with a small gain conducive to fine control when there has been a change in the direction of displacement of the control unit, and particularly during a small displacement immediately following such a change in direction. Thus the method enables coarse actuations of the controlled device to be effected quickly, but greatly facilitates fine trimming of the controlled device in response to small displacements of the control unit. As a result, the operator can obtain more precise and suitable movements of the controlled device, and hence better control performance than was possible heretofore.

What is claimed as the invention is:

1. A method of controlling response fineness in a control system comprising a manipulated unit that is displaceable from and toward a null position, in increase and decrease directions respectively, and a controlled device that is actuated respectively from and toward a neutral position in response to displacements in said directions of said unit, wherein input signals are generated at substantially regular intervals, each designating, by a magnitude thereof, the existing position of displacement of said unit, and an output signal is produced for each input signal, each output signal having a magnitude which signifies a position that the controlled device is to have and which is a function of the magnitude of its input signal and of a gradient relationship between respective displacements of said unit and said device, said method being characterized by:

A. defining a first sequence of output signal magnitudes
(1) related to respective input signals that designate positions of said unit between said null position and a first position spaced therefrom in said increase direction,
(2) said magnitudes in said first sequence having a first gradient of increase in said increase direction relative to their related input signal magnitudes;

B. defining a second sequence of output signal magnitudes
(1) related to respective input signals that designate positions of said unit between said first position and a second position spaced therefrom in said increase direction,
(2) said magnitudes in said second sequence having a second gradient which is substantially higher than said first gradient;

C. defining a third sequence of output signal magnitudes,
(1) related to respective input signals that designate positions of said unit between a third position, intermediate said first and second positions, and a fourth position spaced in said increase direction from the second position, and
(2) having a gradient on the order of said second gradient and such that for a given input signal the related magnitude in said third sequence signifies a smaller displacement of said device from its neutral position than the related magnitude in the second sequence;

D. defining a set of "trim" sequences of output signal magnitudes
(1) related to respective input signals that designate positions of said unit between said first and fourth positions,
(2) all of said "trim" sequences having like gradients on the order of said first gradient,
(3) there being a "trim" sequence in said set for each output signal magnitude in each of said second and third sequences, and
(4) each "trim" sequence including a magnitude that is in said second sequence and a different magnitude that is in said third sequence, each of which magnitudes has a unique relationship to its related input signal whereby the "trim" sequence is identifiable;

E. for each generated input signal that designates a position of said unit between said null position and said first position, producing an output signal having the magnitude in the first sequence that is related to that generated input signal;

F. for each produced output signal, storing information related to
(1) its magnitude and
(2) the input signal for which it was produced whereby a "trim" sequence is identifiable;

G. for each generated input signal that designates a position of said unit between said first and said fourth positions,
(1) assigning as a presumptive output signal magnitude its related magnitude in the "trim" sequence identified by stored information for the last previously produced output signal,
(2) comparing said presumptive output signal magnitude with the respective magnitudes in said second sequence and in said third sequence that are related to the generated input signal, and
  (a) if the presumptive magnitude is equal to or larger than the compared magnitude in said second sequence, producing an output signal having that compared magnitude,
  (b) if the presumptive magnitude is equal to or smaller than the compared magnitude in said third sequence, producing an output signal having that compared magnitude, and
  (c) if the presumptive magnitude is larger that the compared magnitude in the third sequence and smaller than the compared magnitude in the second sequence, producing an output signal having said presumptive magnitude as its magnitude.

2. A method of controlling response fineness in a control system comprising a manipulated unit that is displaceable from and toward a null position, in increase and decrease directions respectively, and a controlled device that is actuated respectively from and toward a neutral position in response to displacements in said directions of said unit, wherein input signals are generated at substantially regular intervals, each designating, by a magnitude thereof, the existing position of displacement of said unit, and an output signal is produced for each input signal, each output signal having a magnitude which signifies a position that the controlled device is to have and which is a function of the magnitude of its input signal and of a gradient relationship between respective displacements of said unit and said device, said method being characterized by:

A. defining a pair of sequences of output signal magnitudes
   (1) the output signal magnitudes of one of said sequences being related to respective input signals that designate positions of said unit between a first position and a second position spaced from said first position in said increase direction,
   (2) the output signal magnitudes of the other of said sequences being related to respective input signals that designate positions of said unit between a third position, intermediate said first and second positions, and a fourth position spaced in said increase direction from the second position, and
   (3) said output signal magnitudes in each of said sequences having a first substantially steep gradient of increase in said increase direction relative to their related input signals, so that for a given input signal the related magnitude in said one sequence signifies a larger displacement of said device from its neutral position than the related magnitude in said other sequence;

B. defining a set of "trim" sequences of output signal magnitudes
   (1) related to respective input signals that designate positions of said unit between said first and fourth positions,
   (2) all of said "trim" sequences having like gradients substantially less steep than said first gradient,
   (3) there being a "trim" sequence in said set for each output signal magnitude in each of said one and said other sequences, and
   (4) each "trim" sequence including a magnitude that is in said one sequence and a different magnitude that is in said other sequence, each of which magnitudes has a unique relationship to its related input signal whereby the "trim" sequence is identifiable;

C. for each produced output signal, storing information related to
   (1) its magnitude and
   (2) the input signal for which it was produced whereby a "trim" sequence is identifiable;

D. for each generated input signal that designates a position of said control unit between said first and said fourth positions,
   (1) assigning as a presumptive output signal magnitude its related magnitude in the "trim" sequence identified by stored information for the last previously produced output signal,
   (2) comparing said presumptive output signal magnitude with the respective magnitudes in said one sequence and in said other sequence that are related to the generated input signal, and
      (a) if the presumptive magnitude is equal to or larger than the compared magnitude in said one sequence, producing an output signal having that compared magnitude,
      (b) if the presumptive magnitude is equal to or smaller than the compared magnitude in said other sequence, producing an output signal having that compared magnitude, and
      (c) if the presumptive magnitude is larger than the compared magnitude in said other sequence and smaller than the compared magnitude in said one sequence, producing an output signal having said presumptive magnitude as its magnitude.

3. A method of controlling response fineness in a control system comprising a manipulated unit that is displaceable from and toward a null position in increase and decrease directions respectively, and a controlled device that is actuated respectively from and toward a neutral position in response to displacements of said unit, wherein an input is generated that has a magnitude which at each instant designates the existing position of displacement of said unit from its null position and an output is produced that has a magnitude which at each instant signifies the position that the controlled device is to have and which is related to the existing magnitude of the input, said method being characterized by:

A. when said unit is in a predetermined range of its positions of displacement, and during every displacement of said unit through no more than a predetermined distance in each said direction that next follows a displacement of said unit in the opposite direction, varying said magnitude of the output in accordance with a first gain relationship between input and output magnitudes;

B. when said unit is in said range of positions, and during every displacement of said unit in the increase direction other than as aforesaid, increasing said magnitude of the output in accordance with a second gain relationship between input and output magnitudes having a substantially higher gradient than said first gain relationship; and C. when said unit is in said range of positions, and during every displacement of said unit in the decrease direction other than as aforesaid, decreasing said magnitude of the output in according with a third gain relationship
   (1) which has a gradient on the order of that of said second gain relationship but
   (2) wherein the output magnitude related to each position of displacement of said unit signifies a greater displacement of the controlled device from its neutral position than the output magnitude of the second gain relationship that is related to the same position of said unit.

4. The method of claim 3 wherein said control unit is displaceable to opposite sides of its said null position and at each said side thereof is displaceable in increase and decrease directions that are respectively from and toward said null position, and wherein said predetermined range of positions is substantially duplicated, there being one such range at each said side of the null position.

5. The method of claim 3, further characterized by: when said unit is between its said null position and said range, and during every displacement of said unit in each said direction, varying said magnitude of the output in accordance with a gain relationship between input and output magnitudes that is on the order of said first gain relationship.

6. The method of claim 3 wherein said input comprises input signals generated at substantially regular intervals, each having a magnitude signifying the existing position of displacement of said control unit, and said output comprises an output signal for each input signal, further characterized by:

D. defining a pair of sequences of output signal magnitudes,
  (1) the output signal magnitudes of one of said sequences
    (a) being related to respective input signals that designate positions of said control unit between a first position, at the end of said range that is proximal to said null position, and a second position in said range that is spaced in said increase direction from said first position and
    (b) having said third gain relationship to their related input signal magnitudes, and
  (2) the output signal magnitudes of the other of said sequences
    (a) being related to respective input signals that designate positions of said control unit between a third position in said range, intermediate said first and second positions, and a fourth position that is at the end of said range remote from the null position, and
    (b) having said second gain relationship to their related input signal magnitudes;
E. defining a set of "trim" sequences of output signal magnitudes
  (1) related to respective input signals that designate positions of said unit between said first and fourth positions,
  (2) the output signal magnitudes in each of said "trim" sequences having said first gain relationship to their related input signals,
  (3) there being a "trim" sequence in said set for each output signal magnitude in each of said one and said other sequences, and
  (4) each "trim" sequence including a magnitude that is in said one sequence and a different magnitude that is in said other sequence, each of which magnitudes has a unique relationship to its related input signal whereby the "trim" sequence is identifiable;
F. for each produced output signal, storing information related to
  (1) its magnitude and
  (2) the input signal for which it was produced whereby a "trim" sequence is identifiable;
G. for each generated input signal that designates a position of said unit between said first and said fourth positions,
  (1) assigning as a presumptive output signal magnitude its related magnitude in the "trim" sequence identified by stored information for the last previously produced output signal,
  (2) comparing said presumptive output signal magnitude with the respective magnitudes in said one sequence and in said other sequence that are related to the generated input signal, and
    (a) if the presumptive magnitude is equal to or larger than the compared magnitude in said one sequence, producing an output signal having that compared magnitude,
    (b) if the presumptive magnitude is equal to or smaller than the compared magnitude in said other sequence, producing an output signal having that compared magnitude, and
    (c) if the presumptive magnitude is larger that the compared magnitude in said other sequence and smaller than the compared magnitude in said one sequence, producing an output signal having said presumptive magnitude as its magnitude.

* * * * *